United States Patent Office 2,697,104
Patented Dec. 14, 1954

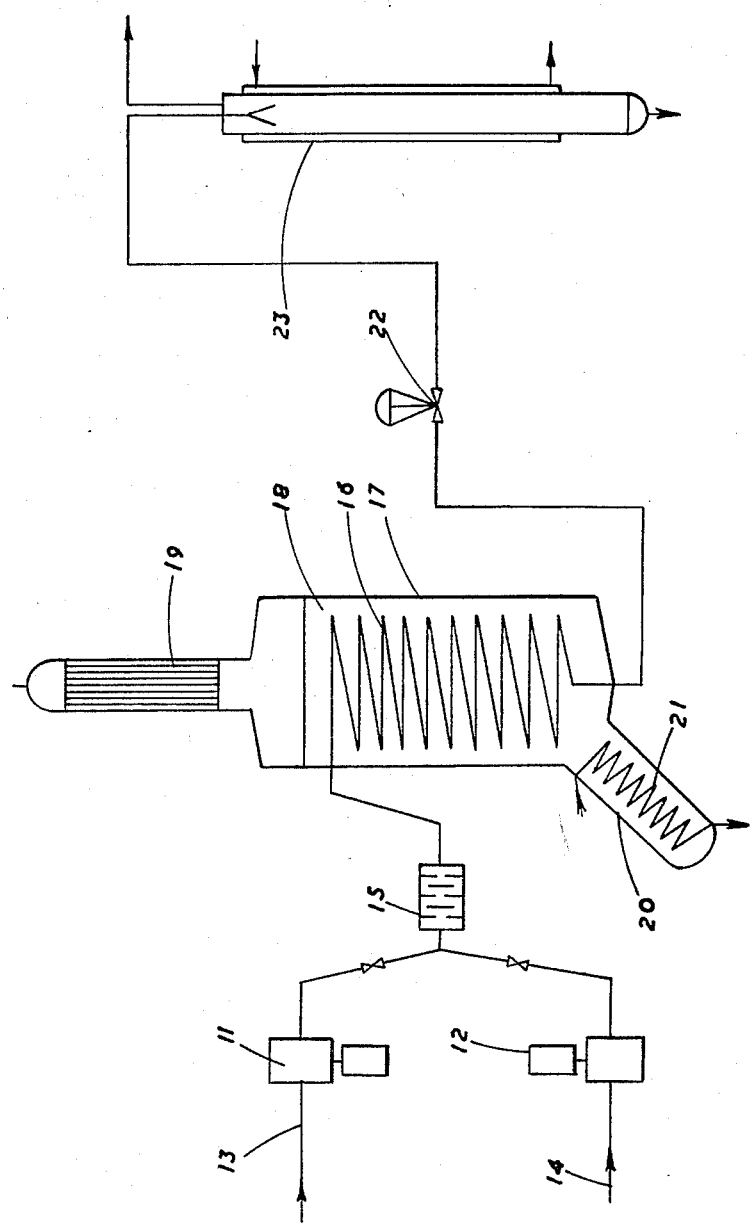

2,697,104

MANUFACTURE OF ETHYLENE OXIDE

Arnold John Lowe, Manchester, and Donald Butler, Moston, Manchester, England, assignors to Oxirane Limited, London, England, a corporation of Great Britain Application August 12, 1952, Serial No. 303,992

Claims priority, application Great Britain August 15, 1951

8 Claims. (Cl. 260—348)

This invention is concerned with improvements in or relating to the manufacture of ethylene oxide.

Ethylene oxide produced by conventional manufacturing methods contains as an impurity its isomer acetaldehyde. Thus ethylene oxide manufactured by the chlorhydrin process has been found to contain up to 1.5% by weight of acetaldehyde, together with traces of other impurities of an acidic or acid-forming nature e. g. acetic acid, ethylene dichloride and ethylene chlorhydrin.

The presence of acetaldehyde, even in quantities as low as 0.1% by weight, is undesirable as it leads to several undesirable features in the products manufactured from ethylene oxide. It causes rank odour of the products and may cause discoloration of the products. It also results in the undesirable development of acidity by the formation of acetic acid. In the production of polyoxyethylene glycols and waxes from ethylene oxide the presence of acetaldehyde leads to low molecular weight products which are often discolored and smelly.

It is difficult and costly to remove the acetaldehyde by distillation and commercially available ethylene oxide which has been purified by fractional distillation usually contains from 0.1 to 1%, and rarely below 0.2%, by weight of acetaldehyde, depending on the efficiency of the distillation process.

The purification of ethylene oxide by distillation from sodium hydroxide or sodium in the presence of small amounts of hydroxy compounds or from organic amines as a batch process has been described but under such conditions the degree and time of heating are difficult to control with the result that there is an appreciable loss of ethylene oxide due to the formation of glycol, or by its reaction with the organic amines. Further, in the latter stages of distillation, when the concentration of organic amine or sodium is large compared with that of ethylene oxide, an uncontrolled reaction may develop with the consequent danger of explosion, particularly when attempted on a large scale.

It has also been proposed to remove aldehydes and acidic impurities from ethylene oxide by bringing the oxide vapor into intimate contact with solid particles of sodium hydroxide or potassium hydroxide, which serves also to dry the oxide. However, the solid or semi-solid tarry mass which is formed is deposited on and adheres to the solid particles of the caustic soda or potash and may lead to a blockage in the purification apparatus. This deposition also limits the available surface area of the hydroxide thereby diminishing the efficiency of the process and ultimately leading to its failure.

It is an object of the present invention to provide an improved process for the purification of ethylene oxide whereby the content of acetaldehyde may be reduced to below 0.1% by weight.

The invention consists in a process for the purification of ethylene oxide containing acetaldehyde as an impurity which comprises continuously passing the ethylene oxide in admixture with an alkali metal glycolate dissolved in a sufficient quantity of a polyoxyalkylene glycol of molecular weight between 100 and 700 to render the reaction mixture homogeneous in the liquid phase, through a reactor whose internal temperature is maintained between 0 and 180° C., under a pressure sufficient to maintain the reaction mixture in the liquid phase, the reaction conditions being so chosen that not more than 5% by weight and preferably not more than 2% by weight of the ethylene oxide is reacted.

In the process of the invention, the acetaldehyde is converted into a high boiling liquid from which the purified ethylene oxide can easily be separated by distillation. The traces of acidic or acid forming impurities will also be removed in the process of the invention.

The glycolates which may be used in the process of the invention are preferably the sodium, potassium or lithium glycolates of the polyoxyalkylene glycol used as the solvent. They may be formed in a known manner by dissolving the alkali metal in the glycol with the consequent liberation of hydrogen or by dissolving the alkali metal hydroxide or methoxide in the glycol and distilling off the water or methanol formed as the case may be. Thus the alkali metal glycolate is normally formed in the polyoxyalkylene glycol used as the solvent and sufficient excess of the latter is present to prevent the reprecipitation of the alkaline material from solution when ethylene oxide is added.

The polyoxyalkylene glycol used is preferably a polyoxyethylene glycol having a molecular weight in the region of 400. The term "polyoxyethylene glycol" as used herein is to be understood to mean a substance having the formula $HOCH_2(CH_2OCH_2)_xCH_2OH$ in conformity with the definition of poly-oxyethylene glycol as defined on page 746 of "Concise Chemical and Technical Dictionary" edited by H. Bennett, 1947 edition, Chemical Publishing Company, Inc., Brooklyn, New York. Likewise, "polyoxyalkylene glycol" is to be understood to mean $HO(C_nH_{2n}O)_xC_nH_{2n}OH$ where $n$ and $x$ are integers.

Some ethylene oxide is lost by the base catalyzed reaction between ethylene oxide and the glycol present in the system (see, for example, copending Patent Application Serial Number 279,768) but the conditions for the purification may be so chosen and controlled that there is no appreciable loss of ethylene oxide.

Thus the concentrations of alkali metal and of the glycol are kept low to reduce the loss of ethylene oxide and the contact time is suitably limited. The contact time may be within the range of 1 to 120 minutes. As the loss of ethylene oxide by side-reaction increases rapidly with temperature, it is desirable to avoid temperatures greatly in excess of 100° C. and the preferred temperature of operation is from 30° to 100° C.

The preferred alkali concentration is within the range 0.010 to 0.025 gm. atoms of alkali metal per liter of reaction mixture, of which a proportion will be neutralized by acidic compounds which are generally present in the impure ethylene oxide or are formed during the reaction.

The quantity of the glycol which is present in the reaction mixture is preferably chosen to be just sufficient to maintain the latter homogeneous and this quantity has generally been found to be such that under the preferred reaction conditions, it may, together with the tarry mass which is formed, be economically discarded as waste after completion of the purification process. With a polyoxyethylene glycol of molecular weight in the region of 400 and with the range of alkali metal concentrations referred to above the ratio by volume of glycol to ethylene oxide may suitably be from 1 to 20 to 1 to 100.

Within the range of alkali metal concentrations referred to above and using a minimum amount of glycol it has not been found necessary to have a contact time in excess of 20 minutes in order to obtain satisfactory purification. In so far as the purification itself is concerned the contact time has been found to be almost independent of the temperature, depending mainly on the concentrations of alkali metal and glycol. However, at a particular reaction temperature an increase in contact time leads to an increase in the amount of acetaldehyde removed from the ethylene oxide but a corresponding increase in the loss of ethylene oxide also results. The preferred range of contact times within the reactor is from 5 to 30 minutes.

The pressure applied to the system is usually considerably greater than that required to maintain the reactants in the liquid state in order to allow for temperature variation within the reactor and depending on the temperature employed may vary from 100 to 2000 lbs./sq. inch gauge pressure.

Preferably the heating of the reactants is effected by surrounding the reactor with a liquid boiling at a suitable constant temperature which serves to heat initially the reactants to the required temperature and also to maintain a substantially constant temperature within the reactor. With the rapid reaction involved it is possible to carry out the reaction continuously in a small strongly constructed reactor having a sufficiently high surface area to volume ratio to provide good heat transfer between the reaction mixture and the surrounding liquid medium. The small size and strength of the reactor, the rapid reaction rate and the substantially complete absence of any vapor phase eliminate to a large extent the dangers inherent in the process.

Following are examples of the process of the invention. In each case the general method of procedure and the apparatus used were as described below, with reference to the accompanying drawing which illustrates diagrammatically a suitable apparatus for the carrying out of the invention.

The hydroxy compound (in each case a polyoxyalkylene glycol) forming the solvent for the basic material was stirred vigorously in a vessel provided with means for heating to 100° C. and cooling to 20° C. The requisite amount of alkali metal combined as the alkoxide or hydroxide was added as a solution, usually in methanol or water, to the stirred mass. Vacuum was next applied and the mass was heated to 100° C. to remove traces of methanol or water. The sodium glycolate solution was cooled down to 25° C. and stored under an atmosphere of nitrogen.

Referring to the drawing, the glycolate solution and ethylene oxide were simultaneously pumped by means of separate proportiometer type pumps 11 and 12 from supply lines 13 and 14 respectively into a mixing device 15 maintained at about 10 to 15° C. The homogeneous reaction mixture was then passed into a tubular coiled reactor 16 consisting of an F. D. P. stainless steel coil 75 ft. long (when extended), ¼" outside diameter, and 0.154" bore. The coil 16 was mounted in a vessel 17 and was completely immersed in a bath of liquid 18 boiling at the required temperature, the vapor being passed through a water-cooled condenser 19 and returned to the bath of liquid 18 as liquid reflux. The liquid 18 was caused to boil vigorously by a heating fluid passing through a coil 21 in reboiler 20. A pressure let-down valve 22 at the exit from the coil enabled the pressure inside the coil to be maintained sufficiently high to keep the reaction mixture in the liquid phase. After emerging through the let-down valve the reacted mixture entered a continuous stripping still 23 maintained at atmospheric pressure and heated to 100° C. to remove the purified ethylene oxide as overhead. The residue, which collected at the bottom of the still in the form of a viscous liquid, was discarded.

*Example 1*

One part by volume of a polyoxyethylene glycol of molecular weight 400 containing 3% by weight of sodium in the form of its sodium glycolate, prepared as described above, and 100 parts by volume of ethylene oxide containing 0.67% by weight of acetaldehyde were continuously passed through the reactor under a pressure of between 30 and 60 atms. A contact time of 1.25 minutes at a temperature of 99° C. gave rise to a product from which 99.4% by weight of the original ethylene oxide feed was recovered. The purified ethylene oxide contained 0.055% by weight of acetaldehyde. An extension of the contact time to 19.1 minutes resulted in the recovery of 98.9% by weight of ethylene oxide which then contained 0.023% by weight of acetaldehyde.

*Example 2*

One part by volume of a polyoxyethylene glycol of molecular weight 400 containing 3% by weight of sodium in the form of its sodium glycolate, prepared as described above, and 100 parts by volume of ethylene oxide containing 0.67% by weight of acetaldehyde were continuously passed through the reactor under a pressure of between 70 and 90 atms. A contact time of 4.7 minutes at a reaction temperature of 32° C. resulted in the recovery of 98.6% by weight of the ethylene oxide feed. The purified ethylene oxide contained 0.048% by weight of acetaldehyde.

*Example 3*

20 parts by volume of ethylene oxide containing 0.67% by weight of acetaldehyde and 1 part by volume polyoxypropyleneoxyethylene glycol of molecular weight 350 containing 0.97% by weight of sodium were continuously passed together through the reactor under pressure of between 40 and 60 atms. and at a temperature between 95 and 99° C. The contact time within the reactor was 9.5 minutes. Niney-five and two-tenths percent by weight of the ethylene oxide feed was recovered in the purified form containing 0.028% by weight of acetaldehyde.

We claim:
1. A process for the reduction of the acetaldehyde content of ethylene oxide containing substantial quantities of acetaldehyde as an impurity, which comprises continuously passing a homogeneous liquid mixture of ethylene oxide, an alkali metal glycolate and a normally liquid substance selected from the group consisting of polyoxyethylene glycols, polyoxypropylene glycols and polyoxypropyleneoxyethylene glycols of a molecular weight between 100 and 700, through a reaction zone at a temperature maintained between 0 and 180° C. and under a pressure which maintains said mixture in the liquid phase, and thereafter recovering purified ethylene oxide from the resulting mixture.

2. A process for the reduction of the acetaldehyde content of ethylene oxide containing substantial quantities of acetaldehyde as an impurity, which comprises continuously passing a homogeneous liquid mixture of ethylene oxide, a normally liquid substance selected from the group consisting of polyoxyethylene glycols, polyoxypropylene glycols and polyoxypropyleneoxyethylene glycols of a molecular weight between 100 and 700 and an alkali metal glycolate of said glycol, through a reaction zone at a temperature maintained between 0 and 180° C. and under a pressure which maintains said mixture in the liquid state, maintaining said liquid mixture in said zone until said mixture contains substantially less than 0.1% of acetaldehyde, and thereafter recovering purified ethylene oxide from the resulting mixture.

3. A process for the reduction of the acetaldehyde content of ethylene oxide containing substantial quantities of acetaldehyde as an impurity, which comprises continuously passing a homogeneous liquid mixture of an alkali metal glycolate, a normally liquid substance selected from the group consisting of polyoxyethylene glycols, polyoxypropylene glycols and polyoxypropyleneoxyethylene glycols of a molecular weight of about 400 and from 20 to 100 parts by volume of ethylene oxide for each volume of said glycol, through a reaction zone at a temperature maintained between 0 and 180° C. and under a pressure which maintains said mixture in the liquid phase, maintaining said liquid mixture in said zone until not more than 5% by weight of ethylene oxide is reacted, and thereafter recovering ethylene oxide containing substantially less than 0.1% by weight of acetaldehyde from the resulting mixture.

4. The process of claim 3 in which the mixture is maintained in the reaction zone for a period of time of from 1 to 120 minutes.

5. A process for the purification of ethylene oxide containing from about 0.1 to 1.5% by weight of acetaldehyde as an impurity, which comprises continuously passing a homogeneous liquid mixture of the ethylene oxide and a normally liquid substance selected from the group consisting of polyoxyethylene glycols, polyoxypropylene glycols and polyoxypropyleneoxyethylene glycols of molecular weight between 100 and 700 containing in solution such an amount of an alkali metal glycolate that the concentration of the alkali metal in the liquid mixture is from 0.010 to 0.025 gram atoms of alkali metal per liter, through a reaction zone maintained at a temperature between 30 and 100° C. and under a pressure which maintains said mixture in the liquid state, maintaining said mixture in said zone until not more than 5% by weight of the ethylene oxide is reacted, and thereafter recovering ethylene oxide containing substantially less than 0.1% by weight of acetaldehyde from the resulting mixture.

6. The process of claim 5 in which the mixture is maintained in the reaction zone for a period of time of from 5 to 30 minutes.

7. The process of claim 5 in which said substance is polyoxyethylene glycol having molecular weights between 100 and 700.

8. The process of claim 5 in which said substance is polyoxypropylene glycol having molecular weights between 100 and 700.

References Cited in the file of this patent

UNITED STATES PATENTS

| Number | Name | Date |
|---|---|---|
| 2,615,901 | McClellan | Oct. 28, 1952 |